US008463494B2

(12) United States Patent
Peariso et al.

(10) Patent No.: US 8,463,494 B2
(45) Date of Patent: Jun. 11, 2013

(54) AFTERMARKET TELEMATICS UNIT AND METHOD FOR INSTALLATION VERIFICATION

(75) Inventors: Nicholas J. Peariso, Pleasant Ridge, MI (US); Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 435 days.

(21) Appl. No.: 12/899,808

(22) Filed: Oct. 7, 2010

(65) Prior Publication Data

US 2012/0089298 A1  Apr. 12, 2012

(51) Int. Cl.
*G06F 7/00* (2006.01)
(52) U.S. Cl.
USPC .......................................................... 701/36
(58) Field of Classification Search
None
See application file for complete search history.

(56) References Cited

U.S. PATENT DOCUMENTS

| | | | |
|---|---|---|---|
| 4,882,565 A | 11/1989 | Gallmeyer | |
| 5,798,688 A | 8/1998 | Schofield | |
| 6,019,475 A | 2/2000 | Lynam et al. | |
| 6,087,953 A | 7/2000 | DeLine et al. | |
| 6,172,613 B1 | 1/2001 | DeLine et al. | |
| 6,329,925 B1 | 12/2001 | Skiver et al. | |
| 6,366,213 B2 | 4/2002 | DeLine et al. | |
| 6,428,172 B1 | 8/2002 | Hutzel et al. | |
| 6,501,387 B2 | 12/2002 | Skiver et al. | |
| 6,505,100 B1 | 1/2003 | Stuempfle et al. | |
| 6,520,667 B1 | 2/2003 | Mousseau | |
| 6,549,793 B1 | 4/2003 | Baratono | |
| 6,654,669 B2 | 11/2003 | Eisenmann et al. | |
| 6,690,268 B2 | 2/2004 | Schofield et al. | |
| 6,756,912 B2 | 6/2004 | Skiver et al. | |
| 6,889,064 B2 | 5/2005 | Baratono et al. | |
| 6,902,284 B2 | 6/2005 | Hutzel et al. | |
| 6,906,632 B2 | 6/2005 | Deline et al. | |
| 6,993,351 B2 | 1/2006 | Fraser et al. | |
| 7,012,727 B2 | 3/2006 | Hutzel et al. | |
| 7,075,511 B1 | 7/2006 | Mousseau et al. | |
| 7,142,810 B2 | 11/2006 | Oesterling | |
| 7,171,187 B2 | 1/2007 | Haave et al. | |
| 7,171,226 B2 | 1/2007 | Crocker et al. | |
| 7,257,426 B1 | 8/2007 | Witkowski et al. | |
| 7,293,888 B2 | 11/2007 | Hutzel et al. | |
| 7,299,076 B2 | 11/2007 | Dunn, Jr. et al. | |

(Continued)

OTHER PUBLICATIONS

USPTO, U.S. "Non-Final Office Action" mailed Nov. 14, 2012 for U.S. Appl. No. 12/851,025, filed Aug. 5, 2010.

(Continued)

*Primary Examiner* — Thomas Tarcza
*Assistant Examiner* — Adam Alharbi
(74) *Attorney, Agent, or Firm* — Ingrassia Fisher & Lorenz, P.C.

(57) ABSTRACT

An aftermarket telematics unit ("ATU") for use with a telematics service system having a call center is disclosed herein. The ATU is adapted for mounting to a vehicle and is configured for operation in an on-mode, a standby-mode, and an off-mode. The aftermarket telematics unit includes, but is not limited to, a memory unit and a processor that is operatively connected to the memory unit. The processor is configured to send a first notification to the call center when a number of transitions from the off-mode to the on-mode experienced by the ATU exceeds a predetermined number during a first predetermined length of time. The processor is further configured to send a second notification to the call center when the ATU has been continuously operating in the on-mode for greater than a second predetermined length of time.

20 Claims, 3 Drawing Sheets

U.S. PATENT DOCUMENTS

| | | |
|---|---|---|
| 7,308,341 B2 | 12/2007 | Schofield et al. |
| 7,346,374 B2 | 3/2008 | Witkowski et al. |
| 7,349,722 B2 | 3/2008 | Witkowski et al. |
| 7,372,818 B2 | 5/2008 | Fraser et al. |
| 7,395,096 B2 | 7/2008 | Baratono et al. |
| 7,474,942 B2 | 1/2009 | Patenaude |
| 7,488,080 B2 | 2/2009 | Skiver et al. |
| 7,526,367 B2 | 4/2009 | Schofield et al. |
| 7,651,228 B2 | 1/2010 | Skiver et al. |
| 7,657,052 B2 | 2/2010 | Larson et al. |
| 7,690,824 B2 | 4/2010 | Uken et al. |
| 7,711,479 B2 | 5/2010 | Taylor et al. |
| 7,734,392 B2 | 6/2010 | Schofield et al. |
| 7,904,023 B2 | 3/2011 | Viitamäki et al. |
| 7,970,446 B2 | 6/2011 | Witkowski et al. |
| 8,194,133 B2 | 6/2012 | Dewind et al. |
| 2002/0197955 A1 | 12/2002 | Witkowski et al. |
| 2003/0001734 A1 | 1/2003 | Schofield et al. |
| 2003/0020603 A1 | 1/2003 | DeLine et al. |
| 2003/0102688 A1 | 6/2003 | Bingle et al. |
| 2003/0117728 A1 | 6/2003 | Hutzel et al. |
| 2003/0191583 A1 | 10/2003 | Uhlmann et al. |
| 2004/0145457 A1 | 7/2004 | Schofield et al. |
| 2004/0160313 A1 | 8/2004 | McCarthy et al. |
| 2004/0165293 A1 | 8/2004 | Whitehead |
| 2004/0203379 A1 | 10/2004 | Witkowski et al. |
| 2004/0209655 A1 | 10/2004 | Kubo |
| 2005/0023858 A1 | 2/2005 | Bingle et al. |
| 2005/0032550 A1 | 2/2005 | Baratono et al. |
| 2005/0040941 A1 | 2/2005 | Schofield et al. |
| 2005/0156714 A1 | 7/2005 | McCarthy et al. |
| 2005/0156753 A1 | 7/2005 | DeLine et al. |
| 2006/0035590 A1 | 2/2006 | Morris et al. |
| 2006/0220817 A1 | 10/2006 | Schofield et al. |
| 2006/0261932 A1 | 11/2006 | Ando et al. |
| 2006/0290518 A1 | 12/2006 | Bingle et al. |
| 2007/0002477 A1 | 1/2007 | Whitehead |
| 2007/0058821 A1 | 3/2007 | Welsh et al. |
| 2007/0109807 A1 | 5/2007 | Lynam et al. |
| 2007/0118280 A1 | 5/2007 | Uhlmann et al. |
| 2007/0132567 A1 | 6/2007 | Schofield et al. |
| 2007/0171037 A1 | 7/2007 | Schofield et al. |
| 2008/0045274 A1 | 2/2008 | Witkowski et al. |
| 2008/0080076 A1 | 4/2008 | Hutzel et al. |
| 2008/0174414 A1 | 7/2008 | McCarthy et al. |
| 2008/0186724 A1 | 8/2008 | Lynam et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0300779 A1 | 12/2008 | Uhlmann et al. |
| 2009/0005136 A1 | 1/2009 | Hutzel et al. |
| 2009/0097674 A1 | 4/2009 | Watson et al. |
| 2009/0134606 A1 | 5/2009 | Schofield et al. |
| 2009/0208058 A1 | 8/2009 | Schofield et al. |
| 2009/0232328 A1 | 9/2009 | DeLine et al. |
| 2009/0284391 A1 | 11/2009 | Berkobin et al. |
| 2009/0290369 A1 | 11/2009 | Schofield et al. |
| 2009/0318084 A1 | 12/2009 | McCarthy et al. |
| 2010/0045790 A1 | 2/2010 | Lynam et al. |
| 2010/0045797 A1 | 2/2010 | Schofield et al. |
| 2010/0188508 A1 | 7/2010 | McMahon et al. |
| 2011/0227698 A1 | 9/2011 | Witkowski et al. |
| 2012/0005395 A1 | 1/2012 | Lydon et al. |
| 2012/0236152 A1 | 9/2012 | Dewind et al. |

OTHER PUBLICATIONS

USPTO, U.S. "Non-Final Office Action" mailed Nov. 28, 2012 for U.S. Appl. No. 12/845,848, filed Jul. 29, 2010.

USPTO, U.S. "Notice of Allowance" mailed Sep. 19, 2012 for U.S. Appl. No. 12/845,822, filed Jul. 29, 2010.

USPTO, U.S. Non-Final Office Action mailed Jan. 18, 2013 for U.S. Appl. No. 12/895,066, filed Sep. 30, 2010.

German Patent & Trademark Office. German Office Action dated Nov. 20, 2012 for Application No. 10 2011 106 073.5.

USPTO, U.S. "Non-Final Office Action" mailed May 4, 2012 for U.S. Appl. No. 12/845,822, filed Jul. 29, 2010.

Owens, K.W., et al. "Telematics Unit and Method for Controlling Telematics Unit for a Vehicle," U.S. Appl. No. 12/845,822, filed Jul. 29, 2010.

Oesterling, C.L., et al. "Aftermarket Telematics Unit for Use With a Vehicle," U.S. Appl. No. 12/845,848, filed Jul. 29, 2010.

Videtich, M.C., et al. "Vehicle Mirror and Telematics System," U.S. Appl. No. 12/851,025, filed Aug. 5, 2010.

Owens, K.W., et al. "Aftermarket Telematics System," U.S. Appl. No. 12/895,066, filed Sep. 30, 2010.

AFTERMARKET TELEMATICS UNIT AND METHOD FOR INSTALLATION VERIFICATION

TECHNICAL FIELD

The technical field generally relates to devices for use with vehicles, and more particularly relates to an aftermarket telematics unit and a method for determining whether the aftermarket telematics unit has been incorrectly installed in a vehicle.

BACKGROUND

Telematics services are services that are provided by a call center to a vehicle and/or to the operator of a vehicle that relate to various needs of the vehicle or the operator. Telematics services commonly include, but are not limited to, the remote monitoring of vehicle maintenance needs, the provision of turn by turn navigation guidance, the coordination of emergency services during vehicle emergencies, the provision of door unlock services when they vehicle's owner is locked out of the vehicle, and the provision of theft tracking services after a vehicle has been stolen, to name just a few.

A telematics service system includes a telematics unit mounted to the vehicle, a call center located remotely from the vehicle, and a communication network that communicatively connects the two. The telematics unit is configured to communicate with both the call center and the vehicle's bus and is therefore capable of communicating various facets of the vehicle's status to the call center.

Historically, the telematics unit has been embedded in the vehicle (i.e., mounted to the vehicle during vehicle assembly) and therefore available to the operator throughout the operator's ownership of the vehicle. With an embedded telematics unit, the operator need only contact the call center and request activation of the embedded telematics unit in order to receive the telematics services.

Because of the popularity of telematics services, aftermarket telematics units are beginning to enter the market place. Such aftermarket telematics units make it possible for drivers of vehicles that lack an embedded telematics unit to, nevertheless, receive some or all of the available telematics services. The aftermarket telematics unit may be mounted to the vehicle and may be wired into to the vehicle's electrical system or battery to draw the power that is needed to operate the aftermarket telematics unit.

In a known example, to receive electrical power from the vehicle, the aftermarket telematics unit includes a constant power line, a switched power line, and a ground line that are configured to be connected to a constant power line, a switched power line, and a ground line, respectively, of the vehicle. When correctly connected to the vehicle, the aftermarket telematics unit is configured to operate in an on-mode when the vehicle is on (e.g., when the vehicle's ignition is turned to either the run or the accessory position), to operate in a standby-mode when the vehicle is off (e.g., when the vehicle's ignition is turned to the off position), and to operate in an off-mode when the vehicle has been turned off for greater than a predetermined length of time, typically five consecutive days. Accordingly, the aftermarket telematics unit typically transitions back and forth between the on-mode and the standby-mode, and will only rarely enter the off-mode. This corresponds with the typical vehicle use case where the vehicle is driven at least once every couple of days and only rarely left off for more than five consecutive days.

When in the on-mode, the aftermarket telematics unit is configured to provide its full range of services to the vehicle and the operator. All of its systems are activated and ready to receive commands/inputs. When in the standby-mode, the majority of the systems of the aftermarket telematics unit are powered down and only a few of the aftermarket telematics unit's systems remain either activated or cycle through alternating periods of sleep and wakefulness. This allows the aftermarket telematics unit to receive communications from the call center even while the vehicle is turned off yet avoids causing excessive battery drain. When in the off-mode, virtually all of the systems of the aftermarket telematics unit are powered down to minimize battery drain. The only function performed by the aftermarket telematics unit while in the off-mode is to monitor the vehicle's switched power line to determine when the vehicle has been turned back on. Once the vehicle is turned back on, the aftermarket telematics unit will transition from the off-mode directly to the on-mode. This is referred to as a "cold start".

If the three electrical lines of the aftermarket telematics unit are not connected to the correct respective electrical lines of the vehicle, some or all of the proper operating modes might be unavailable.

SUMMARY

An aftermarket telematics unit ("ATU") for use with a telematics service system having a call center is disclosed herein. A method for determining whether the ATU has been correctly installed is also disclosed herein. The ATU is adapted for mounting to a vehicle and is configured for operation in an on-mode, a standby-mode, and an off-mode.

In an example, the aftermarket telematics unit includes, but is not limited to, a memory unit and a processor that is operatively connected to the memory unit. The processor is configured to send a first notification to the call center if a number of transitions from the off-mode to the on-mode experienced by the ATU exceeds a predetermined number during a first predetermined length of time. The processor is further configured to send a second notification to the call center if the ATU has been continuously operating in the on-mode for greater than a second predetermined length of time.

In another example, the aftermarket telematics unit includes, but is not limited to, a memory unit and a processor that is operatively connected to the memory unit. The processor is configured to determine if a number of transitions from the off-mode to the on-mode experienced by the ATU exceeds a predetermined number during a first predetermined length of time. The processor is further configured to send a first notification to the call center when the processor determines that the number of transitions from the off-mode to the on-mode experienced by the ATU exceeds the predetermined number during the first predetermined length of time. The processor is further configured to determine if the ATU has been continuously operating in the on-mode for greater than a second predetermined length of time. The processor is still further configured to send a second notification to the call center when the processor determines that the ATU has been continuously operating in the on-mode for greater than a second predetermined length of time.

In another example, the method for determining whether the aftermarket telematics unit has been correctly installed includes, but is not limited to, the step of determining whether a number of transitions experienced by the ATU from the off-mode to the on-mode exceeds a predetermined number during a first predetermined length of time. The method further includes the step of sending a first notification to the call center if the number of transitions experienced by the ATU from the off-mode to the on-mode exceeds the predetermined number during the first predetermined length of time. The method further includes the step of determining whether the ATU has been continuously operating in the on-mode for greater than a second predetermined length of time. The method still further includes the step of sending a second notification to the call center if the ATU has been continuously operating in the on-mode for greater than the second predetermined length of time.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Figure 1:
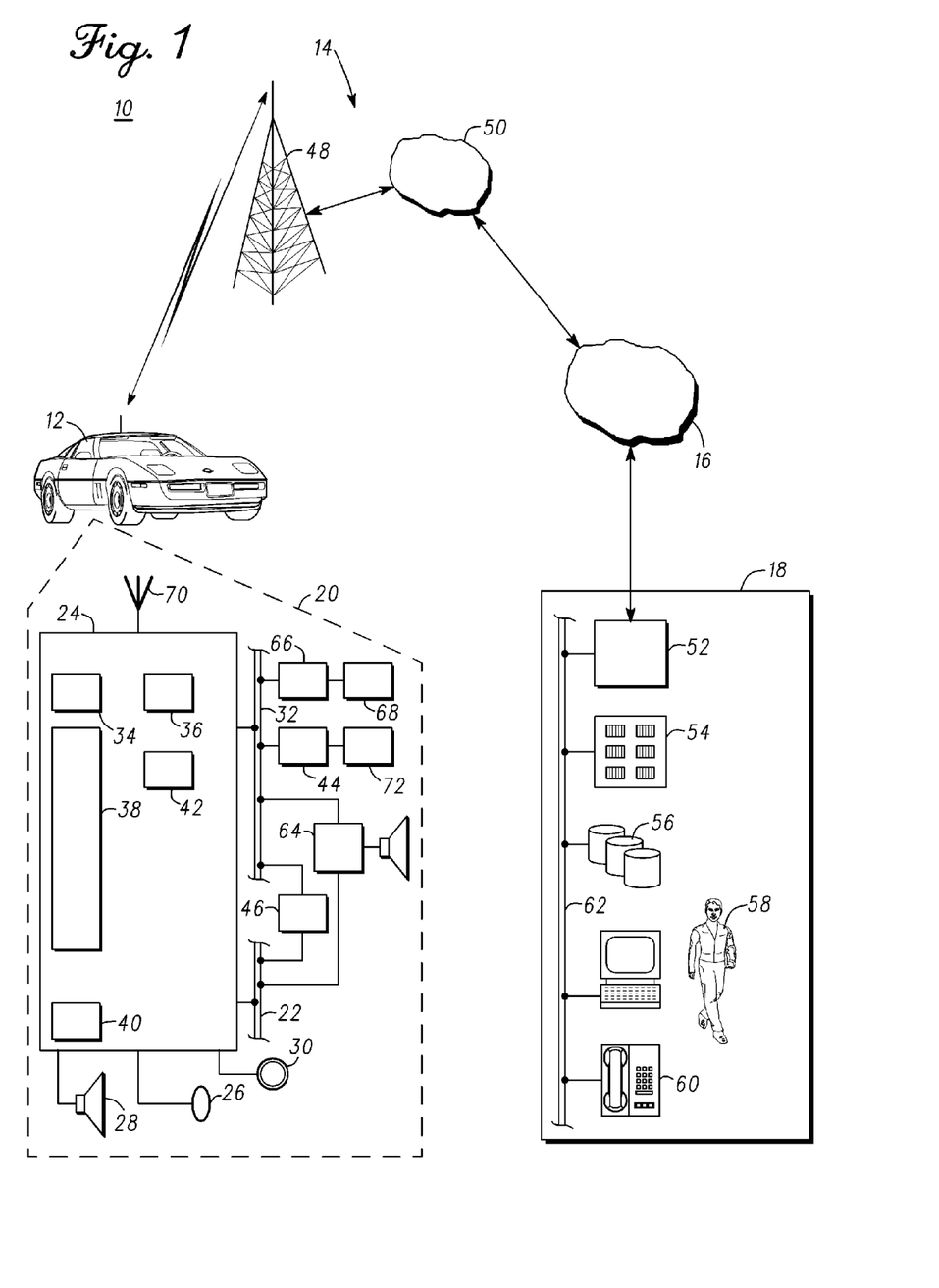
FIG. 1 is a schematic view illustrating an example of a telematics service system compatible for use with examples of the aftermarket telematics unit disclosed herein.

With reference to FIG. 1, there is shown a non-limiting example of a telematics service system 10 that may be used together with examples of the aftermarket telematics unit disclosed herein and it may also be used to implement the examples of the methods disclosed herein for determining whether an aftermarket telematics unit has been correctly installed in a vehicle. Telematics service system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated telematics service system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over telematics service system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more components of vehicle hardware 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision sensor interface module 66 is operatively connected to the vehicle bus 32. The collision sensors 68 provide information to the telematics unit via the collision sensor interface modules 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the advisor 58 or an automated response system, and data transmissions are passed on to a modem or other telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
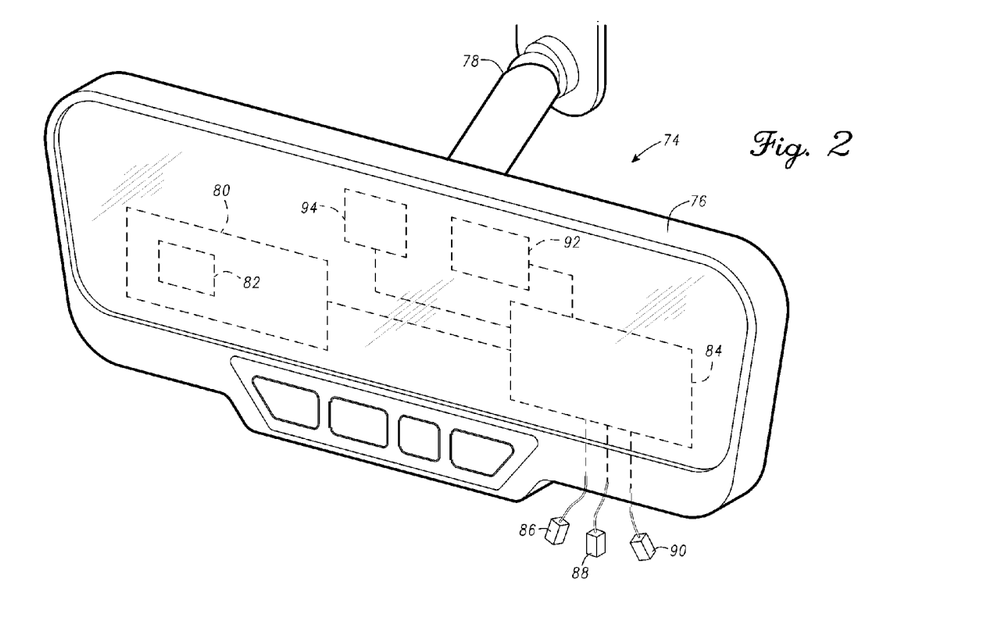
FIG. 2 is an example of an aftermarket telematics unit made in accordance with the teachings disclosed herein.

FIG. 2 is an example of an aftermarket telematics unit 74 made in accordance with the teachings disclosed herein. Examples of an aftermarket telematics unit are disclosed in a pending U.S. patent application having the Ser. No. 12/787,472 filed on May 26, 2010, and in U.S. Publication No. 2005/0273211 published on Dec. 8, 2005, each of which is hereby incorporated herein by reference in its entirety.

With continuing reference to FIGS. 1-2, it is should be understood that FIG. 2 is a simplified illustration that includes only a portion of the components that may typically be included in an aftermarket telematics unit. In other examples, aftermarket telematics unit 74 may include many or all of the same components found in telematics unit 24 of FIG. 1. This simplification is made for the purposes of facilitating the discussion contained herein.

Aftermarket telematics unit 74 includes a housing 76. Housing 76 is configured to contain, and/or enclose the various components of aftermarket telematics unit 74 discussed below. Housing 76 includes a mount 78 for mounting aftermarket telematics unit 74 to vehicle 12. While the example illustrated in FIG. 2 depicts housing 76 as a rearview mirror, it is should be understood that in other examples, housing 76 may be configured as any type of device or component and is not limited to rearview mirror configurations.

Aftermarket telematics unit 74 further includes a memory unit 80. Memory unit 80 may be any type of electronic memory device that is configured to store data. For example, memory unit 80 may include, without limitation, non-volatile memory, disk drives, tape drives, and mass storage devices and may include any suitable software, algorithms and/or sub-routines that provide the data storage component with the capability to store, organize, and permit retrieval of data. In some examples, memory unit 80 may comprise only a single component. In other examples, memory unit 80 may comprise a plurality of components acting in concert. In some examples, memory unit 80 may be dedicated for use exclusively with aftermarket telematics unit 74 while in other examples, memory unit 80 may be shared with other systems onboard vehicle 12. In the illustrated example, memory unit 80s configured to store an electronic file 82, which is discussed in detail below.

Aftermarket telematics unit 74 further includes a processor 84. Processor 84 may be any type of computer, computer system, microprocessor, collection of logic devices such as field-programmable gate arrays (FPGA), or any other analog or digital circuitry that is configured to calculate, and/or to perform algorithms, and/or to execute software applications, and/or to execute sub-routines, and/or to be loaded with and to execute any type of computer program. Processor 84 may comprise a single processor or a plurality of processors acting in concert. In some examples, processor 84 may be dedicated for use exclusively with aftermarket telematics unit 74 while in other examples processor 84 may be shared with other systems onboard vehicle 12.

Processor 84 is operatively coupled to memory unit 80. The operative coupling of processor 84 to memory unit 80 may be affected through the use of any suitable means of transmission including both wired and wireless connections. For example, each component may be physically connected to one another via a coaxial cable or via any other type of wired connection effective to convey electronic signals. In the illustrated example, processor 84 is directly coupled with memory unit 80. In other examples, processor 84 may be operatively coupled with memory unit 80 across a bus or other similar communication corridor. In other examples, the coupling of processor 84 with memory unit 80 may include additional elements positioned in an intervening manner between 84 and memory unit 80. In still other examples, processor 84 and memory unit 80 may be connected wirelessly to one another via any wireless connection that is effective to communicate signals between the two components. Examples of suitable wireless connections include, but are not limited to, a Bluetooth connection, a WiFi connection, an infrared connection or the like.

The operative coupling between processor 84 and memory unit 80 provides a pathway for the transmission of commands, instructions, interrogations, and other signals between processor 84 and memory unit 80. Through this pathway, processor 84 may control and/or communicate with memory unit 80 and may write to or otherwise record data and/or other information to electronic file 82.

Aftermarket telematics unit 74 further includes a ground wire 86, a switched power line 88 in a constant power line 90. Each line is configured for connection to a corresponding power line of the vehicle 12 (not shown). Although the example illustrated in FIG. 2 depicts these wires as being directly connected to processor 84, it should be understood that these wires may be connected to other components of aftermarket telematics unit 74 as well. Because of potential difficulties in determining whether a power line of vehicle 12 is a switched power line or a constant power line, it is possible for a technician attempting to install aftermarket telematics unit 74 into vehicle 12 to make a mistake and attach the power lines incorrectly as described in the background section above.

In some examples, such as the example illustrated in FIG. 2, aftermarket telematics unit 74 may further include a cellular chipset/component 92 and a GPS chipset/component 94. Cellular chipset/component 92 is configured in a manner known to those of ordinary skill in the art to facilitate wireless communications between aftermarket telematics unit 74 and wireless carrier system 14. Cellular chipset/component 92 facilitates communications between vehicle 12 and call-center 18 and may also assist in the provision of other telematics services.

GPS chipset/component 94 is configured in a manner known to those of ordinary skill in the art to facilitate determination of the location of aftermarket telematics unit 74 with respect to the surface of the earth. GPS chipset/component 94 facilitates the provision of turn-by-turn navigation services to the operator of vehicle 12 as well as assisting in the provision of other telematics services.

Cellular chipset/component 92 and a GPS chipset/component 94 are each communicatively connected to processor 84. Accordingly, each are configured to send and receive information and/or instructions to and from processor 84. In other examples, these components may be communicatively connected with processor 84 across a bus or via a short range wireless communication network or via any other suitable means effective to convey information and/or instructions. In some examples, either or both cellular chipset/component 92 and GPS chipset/component 94 may be configured to provide processor 84 with the current date and time.

As used herein, the term "configured" with respect to the functions performed by processor 84 shall mean the processor 84 is programmed to perform the functions indicated or is otherwise loaded with and/or running software or other applications that permit processor 84 to perform the described functions. Processor 84 is configured to notify call center 18 when it has been determined that aftermarket telematics unit 74 has been incorrectly wired to vehicle 12. In some examples, the determination that aftermarket telematics unit 74 has been incorrectly wired to vehicle 12 may be made by some component of aftermarket telematics unit 74 other than processor 84 or it may be made by some component of vehicle 12 which then communicates such determination to processor 84. In other examples described below, processor 84 may be configured to make this determination itself.

In some examples, processor 84 may be configured to detect a cold start of aftermarket telematics unit 74. Accordingly, processor 84 will be configured to determine when aftermarket telematics unit 74 is operating in off-mode and when aftermarket telematics unit 74 is operating in on-mode.

Upon detection of the cold start, processor 84 is configured to send commands to memory unit 80 that cause memory unit 80 to modify electronic file 82 in a manner that records the occurrence of each cold start and the time and date when each cold start occurred. In some examples, processor 84 may be configured to keep track of the time and date without the assistance of any other component of aftermarket telematics unit 74. In other examples, processor 84 may obtain the time and date from cellular chipset/component 92, from GPS chipset/component 94, from some other component of aftermarket telematics unit 74 or from a component of the vehicle 12. Upon detection of a transition from off mode or standby mode (also known as discontinuous receive mode) to on mode, processor 84 is also configured to start a timer that measures the elapsed time during which aftermarket telematics unit 74 continuously operates in the on-mode.

Processor 84 is further configured to periodically determine whether the number of cold starts experienced by aftermarket telematics unit 74 exceeds a predetermined number of cold starts during a first predetermined length of time. To make this determination, processor 84 is configured to retrieve electronic file 82, to use electronic file 82 to calculate the number of cold starts that have occurred over any period of time having a length equal to the first predetermined length of time, and to compare that number with the predetermined number of cold starts. For example, if the first predetermined length of time is five days and if the predetermined number of cold starts is three, then processor 84 would examine electronic file 82 to determine whether the number of cold starts recorded during any five day period of time exceeds a total of three cold starts. In this example, if the number of cold starts experienced by aftermarket telematics unit 74 exceeds three cold starts, then it is reasonable to conclude that aftermarket telematics unit 74 has been incorrectly wired to vehicle 12.

When processor 84 detects that the number of cold starts that have occurred over the first predetermined length of time exceeds the predetermined number, then processor 84 is configured to send notification to the call-center indicating that aftermarket telematics unit 74 has been incorrectly wired to vehicle 12. In some examples, this notification will be sent to call-center 18 via cellular chipset/component 92.

Processor 84 is also configured to compare the elapsed time of continuous operation by aftermarket telematics unit 74 in the on-mode with a second predetermined length of time and to send a notification to call-center 18 when the second predetermined length of time is exceeded. For example, if the second predetermined length of time has been set at twenty-four hours, then processor 84 will compare the elapsed time to twenty four hours. In this example, when the elapsed time equals or exceeds twenty-four hours, it is reasonable to conclude that aftermarket telematics unit 74 has been incorrectly wired to vehicle 12. At that time, processor 84 will send notification to call-center 18 indicating that aftermarket telematics unit 74 has been incorrectly wired to vehicle 12. In some examples, this notification will be sent to call-center 18 via cellular chipset/component 92.

Processor 84 may also be configured to measure the elapsed time of continuous operation by aftermarket telematics unit 74 in the standby-mode after the first time that aftermarket telematics unit 74 has been powered up. aftermarket telematics unit 74 may be configured to go directly from the off-mode to the standby-mode after the very first time that aftermarket telematics unit 74 has been powered up. If switched power line 88 is not connected to a switched power line on vehicle 12, then aftermarket telematics unit 74 will remain in the standby-mode constantly and will not transition to the on-mode. Accordingly, processor 84 can be configured to compare the elapsed time of continuous operation by aftermarket telematics unit 74 in the standby-mode with a third predetermined length of time and to send a notification to call-center 18 when the third predetermined length of time is exceeded. For example, if the third predetermined length of time has been set at ninety six hours, then processor 84 will compare the elapsed time to ninety six hours. In this example, when the elapsed time equals or exceeds ninety six hours, it is reasonable to conclude that aftermarket telematics unit 74 has been incorrectly wired to vehicle 12. At that time, processor 84 will send notification to call-center 18 indicating that aftermarket telematics unit 74 has been incorrectly wired to vehicle 12. In some examples, this notification will be sent to call-center 18 via cellular chipset/component 92. In some examples where aftermarket telematics unit 74 is configured to automatically enter the off-mode after a predetermined period of time that vehicle 12 has been turned off, aftermarket telematics unit 74 may be further configured to send this notification to call center 18 prior to automatically entering the off-mode.

In some examples, it may be desirable to modify the predetermined number of cold starts that may be permitted and/or to modify the second predetermined length of time. For example, when an owner of vehicle 12 initially activates aftermarket telematics unit 74 after purchase, it may be appropriate to reduce the number of cold starts that may be permitted during the first predetermined length of time and to shorten the second predetermined length of time as part of an effort to heighten the sensitivity of aftermarket telematics unit 74 to incorrect wiring and to determine as early as possible whether aftermarket telematics unit 74 has been incorrectly wired to vehicle 12. It may be desirable to configure processor 84 such that this reduced number of permissible cold starts and this reduced second predetermined length of time remains in effect for a specific period of time (e.g., For the first week or the first month after activation of aftermarket telematics unit 74), after which more liberal thresholds may be employed.

In other examples, processor 84 may be further configured to detect when aftermarket telematics unit 74 is operating in standby-mode. In such examples, processor 84 may be further configured to send a notification to call-center 18 indicating that aftermarket telematics unit 74 has been correctly wired to vehicle 12 after the first occurrence of aftermarket telematics unit 74 entering standby-mode. This is because aftermarket telematics unit 74 may enter standby-mode only if it has been correctly wired to vehicle 12.

Figure 3:
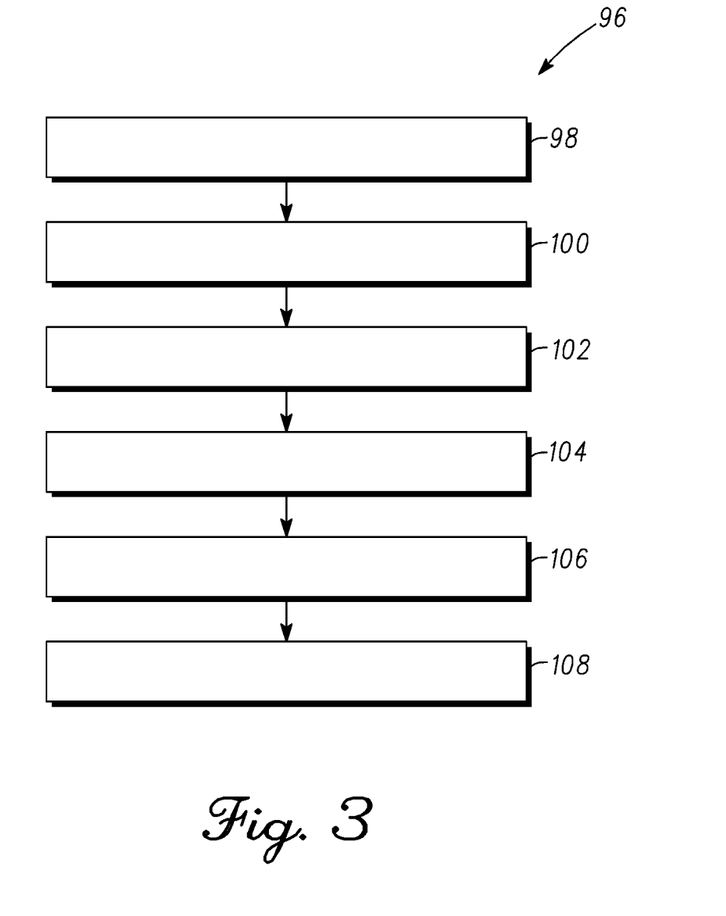
FIG. 3 is a block diagram illustrating an example of a method for determining whether an aftermarket telematics unit has been correctly installed in a vehicle.

FIG. 3 is a block diagram illustrating an example of a method 96 for determining whether an aftermarket telematics unit has been correctly installed in a vehicle. With continuing reference to FIGS. 1-3, method 96 may be used in conjunction with aftermarket telematics unit 74 and with telematics service system 10, or with any suitable aftermarket telematics unit that is configured for operation in on-mode, a standby-mode, and an off-mode, and with any suitable telematics service system that has a call-center.

At block 98, a determination is made regarding whether the number of cold starts experienced by the aftermarket telematics unit exceeds a predetermined number during a first predetermined length of time. As described above, a cold start is a transition of the aftermarket telematics unit from the off-mode to the on-mode. The first predetermined length of time may correspond with a time-out threshold for the aftermarket telematics unit after which it automatically switches to off-mode. For example the aftermarket telematics unit may be configured to automatically begin operating in the off-mode after the vehicle to which it is mounted has been turned off for a period of five days. In this example, because the aftermarket telematics unit would normally enter off-mode only once every five days, it is reasonable to expect that the aftermarket telematics unit will experience a cold start no more frequently than once every five days. In this example, the predetermined length of time would be five days and the predetermined number would be one. In other examples, the predetermined number may be two or three or any other suitable number to allow for vehicle maintenance, battery replacement, or any other circumstance which may entail or result in powering down the aftermarket telematics unit to the off-mode.

At block 100, a notification is sent to the call-center that the number of cold starts experienced by the aftermarket telematics unit exceeds the predetermined number. Such notification may be sent directly by the aftermarket telematics unit, or it may be routed through, or originated by, some other component. The notification may include an indication that the aftermarket telematics unit is incorrectly wired to the vehicle and may further indicate that the constant power line of the aftermarket telematics unit is connected to the switched power line on the vehicle. Once in receipt of this notification, the call-center may advise the telematics service system subscriber that the aftermarket telematics unit is incorrectly wired to the vehicle.

At block 102, a determination is made regarding whether the aftermarket telematics unit has been continuously operating in the on-mode for greater than a second predetermined length of time. This determination may be made by the aftermarket telematics unit itself or by some other component of the vehicle cooperating with the aftermarket telematics unit. In examples where the aftermarket telematics unit makes this determination, the aftermarket telematics unit may be configured to detect when the aftermarket telematics unit begins operating in the on-mode. The aftermarket telematics unit may be further configured to measure the elapsed time of operation in the on-mode and conclude that the aftermarket telematics unit has been incorrectly wired to the vehicle based on the length of the elapsed time. For example, in a typical use case, a vehicle operator typically will not operate their vehicle continuously for longer than eighteen hours. Therefore, the second predetermined length of time may be set at eighteen hours. If it is detected that the aftermarket telematics unit has been operating in the on-mode for length of time exceeding eighteen hours, then it can be concluded that the aftermarket telematics unit is incorrectly wired to the vehicle.

At block 104, a notification is sent to the call-center that the aftermarket telematics has been continuously operating in the on-mode for in excess of the second predetermined length of time. Such notification may be sent directly by the aftermarket telematics unit, or it may be routed through, or originated by, some other component. The notification may include an indication that the aftermarket telematics unit is incorrectly wired to the vehicle and may further indicate that the constant power line and the switched power line of the aftermarket telematics unit or both connected to the constant power line on the vehicle. Once in receipt of this notification, the call center may advise the telematics service system subscriber that the aftermarket telematics unit is incorrectly wired to the vehicle.

At block 106, a determination is made that the aftermarket telematics unit is operating in a standby-mode. This determination may be made by the aftermarket telematics unit itself or by some other component of the vehicle cooperating with the aftermarket telematics unit. The aftermarket telematics unit will only enter the standby-mode if it has been correctly wired to the vehicle.

At block 108, a notification is sent to the call-center indicating that the aftermarket telematics unit has successfully entered the standby-mode. Once in receipt of this notification, the call center may advise the telematics service system subscriber to the aftermarket telematics unit has been correctly wired to the vehicle.

While at least one example has been presented in the foregoing detailed description, it should be appreciated that a vast number of variations exist. It should also be appreciated that the examples described herein are not intended to limit the scope, applicability, or configuration in any way. Rather, the foregoing detailed description will provide those skilled in the art with a convenient road map for implementing the example or examples. It should be understood that various changes can be made in the function and arrangement of elements without departing from the scope as set forth in the appended claims and the legal equivalents thereof.

What is claimed is:

1. An aftermarket telematics unit ("ATU") for use with a telematics service system having a call center, the ATU being adapted for mounting to a vehicle and being configured for operation in an on-mode, a standby-mode, and an off-mode, the ATU comprising:
   a memory unit; and
   a processor operatively connected to the memory unit, the processor configured to:
      send a first notification to the call center when a number of transitions from the off-mode to the on-mode experienced by the ATU exceeds a predetermined number during a first predetermined length of time, and
      send a second notification to the call center when the ATU has been continuously operating in the on-mode for greater than a second predetermined length of time.

2. The ATU of claim 1, wherein the processor is further configured to determine when the number of transitions from the off-mode to the on-mode experienced by the ATU exceeds the predetermined number during the first predetermined length of time.

3. The ATU of claim 2, wherein the processor is further configured to detect each transition of the ATU from the off-mode to the on-mode and to record each transition of the ATU from the off-mode to the on-mode in an electronic file stored in the memory unit.

4. The ATU of claim 3, wherein the processor is further configured to record in the electronic file a time when each transition of the ATU from the off-mode to the on-mode occurs.

5. The ATU of claim 4, wherein the processor is further configured to utilize the electronic file to determine the number of transitions of the ATU from the off-mode to the on-mode that occur during the first predetermined length of time and to compare the number of transitions of the ATU from the off-mode to the on-mode that occur during the first predetermined length of time with the predetermined number.

6. The ATU of claim 1, wherein the processor is further configured to determine when the ATU has been continuously operating in the on-mode for longer than the second predetermined length of time.

7. The ATU of claim 6, wherein the processor is further configured to detect when the ATU begins operating in the on-mode, to measure an elapsed time starting from when the ATU begins operating in the on-mode and continuing while the ATU continues to operate in the on mode, and to send the second notification when the elapsed time exceeds the second predetermined length of time.

8. The ATU of claim 1, wherein the processor is further configured to determine a first time that the ATU transitions from the on-mode to the standby-mode and to send a third notification to the call center when the processor detects the first time that the ATU transitions from the on-mode to the standby-mode.

9. The ATU of claim 1, wherein the processor is further configured to send a fourth notification to the call center when the ATU has been continuously operating in the standby-mode after an initial power up for greater than a third predetermined period of time.

10. The ATU of claim 9, wherein the processor is further configured to send the fourth notification prior to entering the off-mode.

11. An aftermarket telematics unit ("ATU") for use with a telematics service system having a call center, the ATU being adapted for mounting to a vehicle and configured for operation in an on-mode, a standby-mode, and an off-mode, the aftermarket telematics unit comprising:
    a memory unit; and
    a processor operatively connected to the memory unit, the processor configured to:
       determine when a number of transitions from the off-mode to the on-mode experienced by the ATU exceeds a predetermined number during a first predetermined length of time,
       send a first notification to the call center when the processor determines that the number of transitions from the off-mode to the on-mode experienced by the ATU exceeds the predetermined number during the first predetermined length of time,
       determine when the ATU has been continuously operating in the on-mode for greater than a second predetermined length of time, and
       send a second notification to the call center when the processor determines that the ATU has been continuously operating in the on-mode for greater than the second predetermined length of time.

12. The aftermarket telematics unit of claim 11, wherein the processor is further configured to detect each transition of the ATU from the off-mode to the on-mode and to record each transition of the ATU from the off-mode to the on-mode in an electronic file stored in the memory unit.

13. The aftermarket telematics unit of claim 12, wherein the processor is further configured to record in the electronic file a time when each transition of the ATU from the off-mode to the on-mode occurs.

14. The aftermarket telematics unit of claim 13, wherein the processor is further configured to utilize the electronic file to determine the number of transitions of the ATU from the off-mode to the on-mode that occur during the first predetermined length of time and to compare the number of transitions of the ATU from the off-mode to the on-mode that occur during the first predetermined length of time with the predetermined number.

15. The aftermarket telematics unit of claim 11, wherein the processor is further configured to detect when the ATU begins operating in the on-mode, to measure an elapsed time starting from when the ATU begins operating in the on-mode and continuing while the ATU continues to operate in the on mode, and to send the second notification when the elapsed time exceeds the second predetermined length of time.

16. The aftermarket telematics unit of claim 11, wherein the processor is further configured to determine a first time that the ATU transitions from the on-mode to the standby-mode and to send a third notification to the call center when the processor detects the first time that the ATU transitions from the on-mode to the standby-mode.

17. The aftermarket telematics unit of claim 11, wherein a magnitude of the predetermined number corresponds with a length of time that the ATU has been activated.

18. The aftermarket telematics unit of claim 11, wherein a magnitude of the second predetermined length of time corresponds with a length of time that the ATU has been activated.

19. A method for determining whether an aftermarket telematics unit ("ATU") has been correctly installed in a vehicle, the ATU being configured for use with a telematics service system having a call center, and further configured for operation in an on-mode, a standby-mode, and an off-mode, the method comprising the steps of:

determining whether a number of transitions experienced by the ATU from the off-mode to the on-mode exceeds a predetermined number during a first predetermined length of time;

sending a first notification to the call center when the number of transitions experienced by the ATU from the off-mode to the on-mode exceeds the predetermined number during the first predetermined length of time;

determining whether the ATU has been continuously operating in the on-mode for greater than a second predetermined length of time; and sending a second notification to the call center when the ATU has been continuously operating in the on-mode for greater than the second predetermined length of time.

20. The method of claim 19, further comprising the steps of:

determining a first time that the ATU transitions from the on-mode to the standby-mode; and sending a third notification to the call center the first time that the ATU transitions from the on-mode to the standby-mode.

* * * * *